(12) United States Patent
Kuepper et al.

(10) Patent No.: US 10,864,826 B2
(45) Date of Patent: Dec. 15, 2020

(54) SEAT INCLUDING INFRARED-INDICATOR MATERIAL IN A PATTERN

(71) Applicant: Ford Global Technologies, LLC, Dearborn, MI (US)

(72) Inventors: Philipp Kuepper, Grevenbroich (DE); William Jerome Olsen, Farmington Hills, MI (US); James Robert Chascsa, II, Farmington Hills, MI (US); Jeffrey Tien Vo, Candler, NC (US)

(73) Assignee: Ford Global Technologies, LLC, Dearborn, MI (US)

( * ) Notice: Subject to any disclaimer, the term of this patent is extended or adjusted under 35 U.S.C. 154(b) by 115 days.

(21) Appl. No.: 16/262,510

(22) Filed: Jan. 30, 2019

(65) Prior Publication Data

US 2020/0238851 A1   Jul. 30, 2020

(51) Int. Cl.
*G06K 9/00* (2006.01)
*B60N 2/00* (2006.01)
*G01B 11/02* (2006.01)
*G01B 11/26* (2006.01)
*B60N 2/58* (2006.01)

(52) U.S. Cl.
CPC ............ *B60N 2/002* (2013.01); *B60N 2/58* (2013.01); *G01B 11/02* (2013.01); *G01B 11/26* (2013.01)

(58) Field of Classification Search
CPC ...... B60N 2/0232; A43D 79/00; A47C 23/02; B23G 1/46; B25B 27/06
USPC ............ 382/103, 100; 340/457.1, 988, 439; 454/120; 62/239; 112/475.01; 428/29; 442/131, 59; 345/173
See application file for complete search history.

(56) References Cited

U.S. PATENT DOCUMENTS

| | | | |
|---|---|---|---|
| 5,835,613 A | 11/1998 | Breed et al. | |
| 8,312,826 B2* | 11/2012 | Lafferty | B60N 2/5891 112/475.01 |
| 2011/0285657 A1* | 11/2011 | Shimotani | G06F 3/0416 345/173 |
| 2017/0156317 A1 | 6/2017 | Messinger et al. | |
| 2019/0258263 A1* | 8/2019 | Wendel | B60W 60/00253 |
| 2020/0055480 A1* | 2/2020 | Herbert | G06K 9/2018 |

FOREIGN PATENT DOCUMENTS

WO   0038949 A2   7/2000

* cited by examiner

*Primary Examiner* — Charlotte M Baker
(74) *Attorney, Agent, or Firm* — Frank A. MacKenzie; Bejin Bieneman PLC (57) ABSTRACT

A system includes a seat having an upholstery, an infrared-light source spaced from the seat and aimed at the seat, and an infrared sensor having a field of view. The seat is disposed in the field of view. Infrared-indicator threads are threaded with the upholstery and include exposed portions overlapping the upholstery in a pattern.

19 Claims, 7 Drawing Sheets

SEAT INCLUDING INFRARED-INDICATOR MATERIAL IN A PATTERN

BACKGROUND

Occupant size may be a metric in vehicle design to accommodate various sizes and shapes of occupants. A vehicle may include restraint systems, such as airbags and seatbelts, to secure or control the motion of objects or occupants in the vehicle. The restraint systems may be optimized for the size of the occupant and his or her seating position. For example, the restraint systems may be adjusted electronically or using pyrotechnics based on the size of the occupant.

DETAILED DESCRIPTION

A system includes a seat including an upholstery, an infrared-light source spaced from the seat and aimed at the seat, and an infrared sensor having a field of view. The seat is disposed in the field of view. Infrared-indicator threads are threaded with the upholstery and include exposed portions overlapping the upholstery in a pattern.

The infrared-indicator threads may be stitched to the upholstery.

The infrared-indicator threads may be woven into the upholstery.

The infrared-indicator threads may reflect infrared light.

The infrared-indicator may absorb infrared light.

The system may include a seatbelt and infrared-indicator threads threaded with the seatbelt in a second pattern different from the pattern.

The pattern may be a repeating pattern.

The pattern may be a growing pattern.

The seat may include a plurality of zones extending along a lateral axis of the seat and a vertical axis of the seat transverse to the lateral axis. The pattern may be different in each zone of the seat.

The seat may include a seatback, a seat bottom, and a head restraint. The seat back, the seat bottom, and the head restraint may each be one zone.

The seat may include a seatback, a seat bottom, and a head restraint. At least one of the seatback, the seat bottom, and the head restraint may have the plurality of zones.

The system may include a processor and a memory storing instructions to identify a size of an occupant in response to detecting a gap in the pattern.

The system may include a processor and a memory storing instructions to identify a position of the seat in response to detecting the pattern.

The seat may include a seatback. The system may include a processor and a memory storing instructions to identify an angular position of the seatback in response to detecting the pattern.

A system includes a seat including an upholstery having threads, an infrared-light source spaced from the seat and aimed at the seat, and an infrared sensor having a field of view. The seat is disposed in the field of view. An infrared-indicator material is woven with the threads and includes exposed portions overlapping the threads in a pattern.

The infrared-indicator material may be a sheet including a plurality of perforations. The threads of the upholstery may be woven through the plurality of perforations.

The infrared-indicator material may be threads.

A system includes a seat including an upholstery having threads, an infrared-light source spaced from the seat and aimed at the seat, and an infrared sensor having a field of view. The seat is disposed in the field of view. An infrared-indicator material including exposed portions is impressed onto the upholstery in a pattern.

The infrared-indicator material may be ink printed on the upholstery.

The infrared-indicator material may be threads deposited on the upholstery.

With reference to the Figures, wherein like numerals indicate like parts throughout the several views, a vehicle 10 is generally shown. The vehicle 10 includes a system 12 having a seat 14, an infrared-light source 16, and an infrared sensor 18. The seat 14 includes an upholstery 20. The infrared-light source 16 is spaced from the seat 14 and aimed at the seat 14. The infrared sensor 18 includes a field of view 22. The seat 14 is disposed in the field of view 22. Infrared-indicator material 52 is patterned on the seat 14. For example, infrared-indicator threads 24 are threaded with the upholstery 20 and include exposed portions 26 overlapping the upholstery 20 in a pattern 28.

The system 12 may provide a convenient and robust manner of classifying occupants by size. For example, the system 12 may classify occupants by size based on interferences in the pattern 28 of infrared-indicator threads 24 on the upholstery 20. Furthermore, the system 12 may provide a convenient and robust manner of detecting a position of the seat 14. For example, the system 12 may detect the position of the seat 14 based on distortions in the size and spacing of the exposed portions 26 in the pattern 28. The size classification of the occupant and the detection of the position of the seat 14 may be useful to allow a computer to customize one or more safety features of the vehicle 10, for example, a load limit of an automatic locking retractor, a stiffness of an airbag, and/or a stroke absorption of a steering column.

The vehicle 10 may be any suitable type of automobile, e.g., a passenger or commercial automobile such as a sedan, a coupe, a truck, a sport utility vehicle, a crossover vehicle, a van, a minivan, a taxi, a bus, etc. The vehicle 10, for example, may be an autonomous vehicle. In other words, the vehicle 10 may be autonomously operated such that the vehicle 10 may be driven without constant attention from a driver, i.e., the vehicle 10 may be self-driving without human input.

Figure 1:
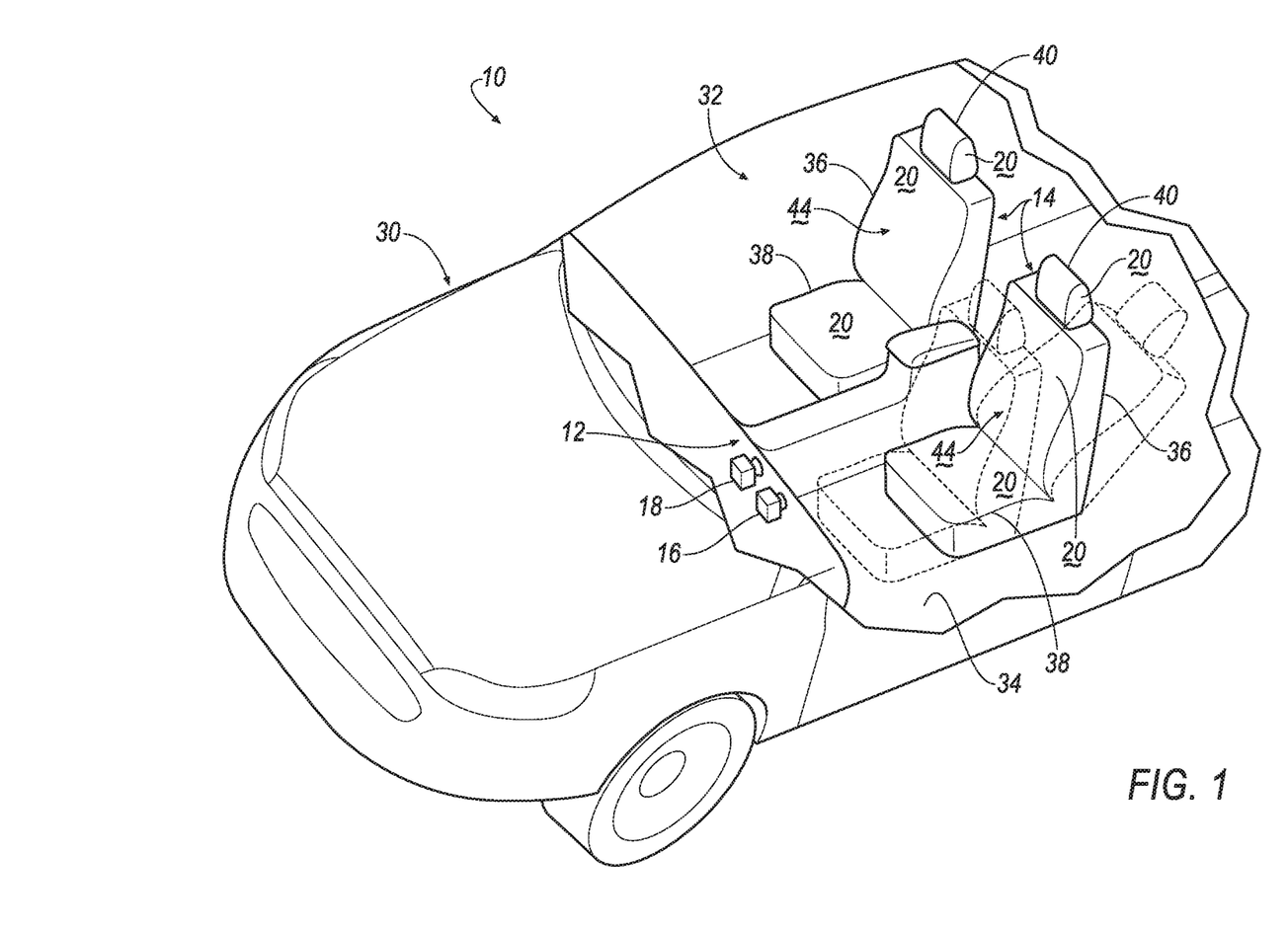
FIG. 1 is a perspective view of a vehicle including a seat and an infrared sensor facing the seat.

With reference to FIG. 1, the vehicle 10 includes a body 30 defining a passenger cabin 32. The passenger cabin 32 houses occupants, if any, of the vehicle 10. The passenger cabin 32 includes a front end (not numbered) and a rear end (not numbered) with the front end being in front of the rear end during forward movement of the vehicle 10. The passenger cabin 32 includes one or more seats 14. The seats 14 may be arranged in any suitable arrangement. For example, one or more of the seats 14 may be at the front end of the passenger cabin 32, i.e., a front seat, and/or one or more of the seats 14 may be at the rear end of the passenger cabin 32, i.e., a rear seat.

The body 30 includes a floor 34. The floor 34 may define the lower boundary of the passenger cabin 32 and may extend from the front end of the passenger cabin 32 to the rear end of the passenger cabin 32.

Figure 4A:
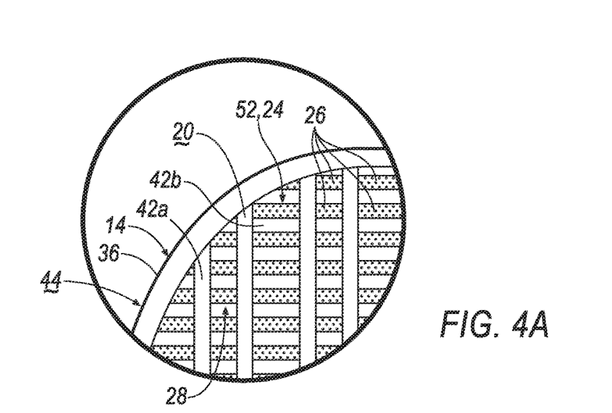
FIG. 4A is a magnified view of the seatback including infrared-indicator threads woven with the upholstery.
Figure 4B:
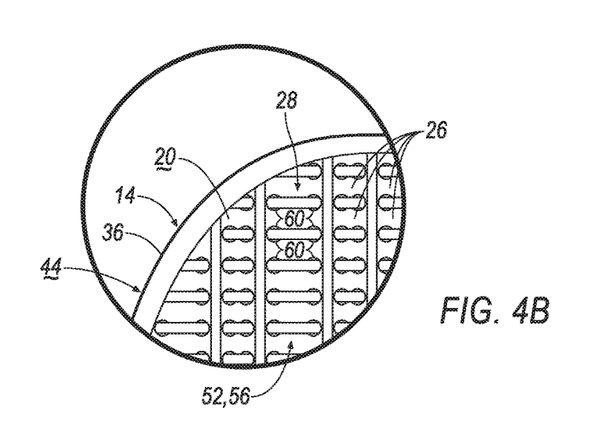
FIG. 4B is a magnified view of the seatback including an infrared-indicator sheet having perforations woven with the upholstery.
Figure 4C:
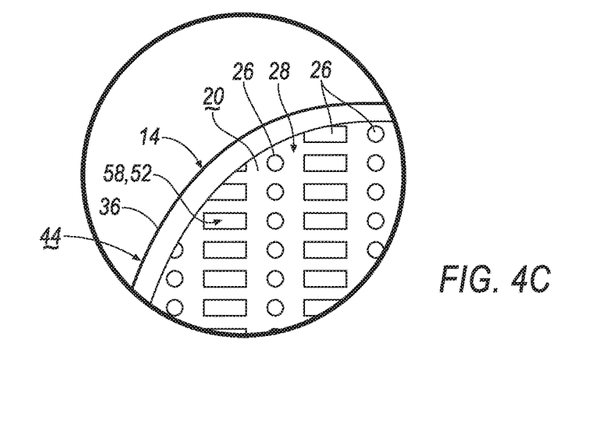
FIG. 4C is a magnified view of the seatback including the upholstery being leather and infrared-indicator material impressed on the upholstery.

With reference to FIGS. 4A-C, each seat 14 may include a seatback 36, a seat bottom 38, and a head restraint 40. The head restraint 40 may be supported by the seatback 36 and may be stationary or movable relative to the seatback 36. The seatback 36 may be supported by the seat bottom 38 and may be stationary or movable relative to the seat bottom 38. The seatback 36, the seat bottom 38, and/or the head restraint 40 may be adjustable in multiple degrees of freedom. Specifically, the seatback 36, the seat bottom 38, and/or the head restraint 40 may themselves be adjustable, in other words, adjustable components within the seatback 36, the seat bottom 38, and/or the head restraint 40, and/or may be adjustable relative to each other.

The seatback 36 may be pivotable to a plurality of angular positions relative to the seat bottom 38. In other words, the seatback 36 may be disposed in any suitable angular position relative to the seat bottom 38. For example, the seatback 36 may be generally upright, i.e., orthogonal, relative to the seat bottom 38, as shown in solid lines in FIG. 1. As another example, the seatback 36 may be oblique to the seat bottom 38, i.e., reclined, as shown in phantom lines in FIG. 1. The seatback 36 may be releasably fixed in position relative to the seat bottom 38 at a selected one of the plurality of angular positions in any suitable way.

With reference to FIG. 1, the seats 14 may be supported on the floor 34, i.e., directly on or through intermediate components. The position and orientation of the seats 14 and components thereof may be adjustable by the occupant. The seats 14, for example, may each be moveable along a seat track (not shown) that is fixed to the floor 34. For example, the seat bottom 38 may be slideably engaged with the seat track. The seats 14 may be moveable to a plurality of positions along the seat track. For example, the seats 14 may be moveable towards the front end of the passenger cabin 32 as shown in phantom lines in FIG. 1. In other words, the seats 14 may be disposed in any suitable position along the seat track in the vehicle-fore-and-aft direction. As another example, the seats 14 may be moveable towards a side of the passenger cabin 32. In this situation, the seats 14 may be disposed in any suitable position along the seat track in a cross-vehicle direction. Additionally, or alternatively, each seat 14 may be rotatable relative to the floor 34. For example, each seat 14 may be supported by a pivotable base (not shown) supported by the seat track. The seats 14 may be releasably fixed in position relative to the seat track at a selected one of the plurality of positions in any suitable way.

Each seat 14 may define a lateral axis L extending from one side of the seat 14 to the other side of the seat 14, as shown in FIG. 2. Each seat 14 may define a vertical axis V extending transverse to the lateral axis L, as shown in FIG. 2. For example, the vertical axis V may extend through the seat 14 bottom and the floor 34.

The seat 14 may include a seat frame (not shown) and the upholstery 20 supported on the seat frame, as shown in FIGS. 1-5. The seat frame may include tubes, beams, etc. The seat frame may be formed of any suitable plastic material, e.g., carbon fiber reinforced plastic (CFRP), glass fiber-reinforced semi-finished thermoplastic composite (organosheet), etc. As another example, some or all components of the seat frame may be formed of a suitable metal, e.g., steel, aluminum, etc.

The upholstery 20 may be any suitable material. For example, the upholstery 20 may be leather, as shown in FIG. 4C. As another example, the upholstery 20 may be cloth, such as nylon, polyester, etc., as shown in FIGS. 4A and 4B. In this situation, the upholstery 20 may include a plurality of threads 42 woven together, as set forth further below. The upholstery 20 may be stitched in panels around the seat frame. A padding may be between the upholstery 20 and the seat frame and may be foam or any other suitable material.

With reference to FIGS. 4A and 4B, the plurality of threads 42 may include vertical threads 42a and horizontal threads 42b. The vertical threads 42a may extend along the vertical axis V of the seat 14. For example, the vertical threads 42a may be warp threads. Although only shown on a portion of the seat 14, it is to be understood that the vertical threads 42a may extend along the entire height of the seat 14. It is to be further understood that the vertical threads 42a may be arranged next to each other between the sides of the seat 14, and that the vertical threads 42a are not shown to scale. To put it another way, the vertical threads 42a may be thinner and closer together than shown, e.g., the vertical threads 42a may have a higher thread count than shown.

The horizontal threads 42b extend transverse to the vertical threads 42a, e.g., along the lateral axis L of the seat 14. For example, the horizontal threads 42b may be weft threads. Although only shown on a portion of the seat 14, the horizontal threads 42b may extend along the entire width of the seat 14, and that the horizontal threads 42b are not shown to scale. To put it another way, the horizontal threads 42b may be thinner and closer together than shown, e.g., the horizontal threads 42b may have a higher thread count than shown. In this situation, the horizontal threads 42b are interwoven with the vertical threads 42a, e.g., to form the upholstery 20.

The seat 14 may include a front 44 facing in a vehicle-forward direction, e.g., toward the infrared sensor 18 and the infrared-light source 16. In other words, the front 44 of the seat may face the front end of the passenger cabin 32, e.g., an instrument panel. The occupant may contact the front 44 of the seat 14 when the occupant is seated in the seat 14. For example, a head of the occupant may contact the front 44 on the head restraint 40, a torso of the occupant may impact the front 44 on the seatback 36, and legs of the occupant may impact the front 44 on the seat bottom 38.

The seat 14 may have a plurality of zones 46 (reference numeral 46 is used as a general identifier for each zone 46 and each zone in figures also includes an alphabetic identifier). A zone 46 is a portion of the seat 14. The zones 46 may extend along the lateral axis L and the vertical axis V on one or more components. The zones 46 may be any suitable size, e.g., the zones 46 may be a same or a different size. Said differently, the size of the zones 46 may be uniform or the size of the zones 46 may vary. Each of the seatback 36, the seat bottom 38, and the head restraint 40 each may, for example, be one zone 46a, 46b, 46c, respectively, as shown in the Figures. As another example, each zone 46 may be a portion of one of the seatback 36, the seat bottom 38, and the head restraint 40, respectively. The zones 46 may have any suitable shape, e.g., rectangular.

Each seat 14 may include a seatbelt assembly 48 having the seatbelt retractor (not shown) and the webbing 50 retractably payable from the seatbelt retractor, as shown in FIG. 2. Additionally, the seatbelt assembly 48 may include an anchor (not numbered) coupled to the webbing 50, and a clip (not shown) that engages a buckle (not shown). The seatbelt assembly 48 may be disposed adjacent the seat 14. For example, the seatbelt assembly 48 is adjacent the front seat, as shown in FIG. 1. The seatbelt assembly 48, when fastened, retains the occupant on the seat 14, e.g., during sudden decelerations of the vehicle 10.

The anchor attaches one end of the webbing 50 to the seat 14. The other end of the webbing 50 feeds into the seatbelt retractor. The clip slides freely along the webbing 50 and, when engaged with the buckle, divides the webbing 50 into a lap band and a shoulder band.

The seatbelt assembly 48 may be a three-point harness, as shown in FIG. 1, meaning that the webbing 50 is attached at three points around the occupant when fastened: the anchor, the seatbelt retractor, and the buckle. The seatbelt assembly 48 may, alternatively, include another arrangement of attachment points.

The webbing 50 may include a first plurality of threads (not shown) and a second plurality of threads (not shown) extending transverse to and interwoven with the first plurality of threads. Specifically, the first plurality of threads may extend longitudinally along the webbing 50, and the second plurality of threads may extend laterally across the webbing 50. The first plurality of threads and the second plurality of threads may be interwoven with each other by one-piece weaving to create the webbing 50. The first plurality of threads and the second plurality of threads may be any suitable material, e.g., nylon, polyester, etc.

The infrared-light source 16 can provide infrared light to the passenger cabin 32. The infrared-light source 16 can be a device that converts electricity into infrared light, e.g., a light emitting diode that generates infrared light, a laser, etc. For example, the infrared-light source 16 can be a component of a lidar sensor.

The infrared-light source 16, may be oriented to provide infrared light towards the seats 14. In other words, the infrared-light source 16 may be aimed at the seats 14. Specifically, the infrared-light source 16 may be aimed at the front 44 of the seats 14, i.e., in a vehicle rearward direction. For example, infrared light from the infrared-light source 16 may travel from the infrared-light source 16 to one or more seats 14. The vehicle 10 may include any suitable number of infrared-light sources 16. For example, the vehicle 10 may include one infrared-light source 16 for each seat 14. As another example, the vehicle 10 may include one infrared-light source 16 for the front seats and one infrared-light source 16 for the rear seats. As yet another example, the vehicle 10 may include one infrared-light source 16 in the passenger cabin 32.

The infrared-light source 16 may be disposed at any suitable location in the passenger cabin 32. For example, the infrared-light source 16 may be disposed at the front end of the passenger cabin 32. Specifically, the infrared-light source 16 may be supported by an instrument panel, as shown in FIG. 1. Alternatively, the infrared-light source 16 may be attached to any other suitable vehicle component such as the body 30, e.g., an A-pillar, a B-pillar, the roof, etc., the seatback 36 of the front seats, the rearview mirror, etc.

The infrared sensor 18 may be aimed at, i.e., arranged to have the field of view 22 including, one or more of the seats 14. Specifically, the infrared sensor 18 may be aimed at the seat 14, i.e., the driver seat. The infrared sensor 18 may, for example, be fixedly mounted in a position in which the seat 14, e.g., the seatback 36, the seat bottom 38, and the head restraint 40, is in a field of view 22 of the infrared sensor 18 regardless of how a position of the seat 14 is adjusted. As another example, the infrared sensor 18 may be moveably mounted, e.g., by servomotors (not shown), and movement of the infrared sensor 18 may track adjustment of the position of the seat 14.

The infrared sensor 18 is attached in the passenger cabin 32. For example, the infrared sensor 18 may be mounted on or in the instrument panel, as shown in FIG. 1, such as behind a steering wheel or centered on the instrument panel near a bottom edge of a windshield. As another example, the infrared sensor 18 may be attached to a rear-view mirror and face rearward. As yet another example, the infrared sensor 18 may be mounted to a roof of the vehicle 10. The infrared sensor 18 outputs data in the form of video, i.e., a temporal sequence of images, e.g., digital images.

The system 12 may include one or more infrared sensors 18, e.g., infrared camera(s). An infrared sensor 18 is an electronic sensor such as is known that measures infrared light radiating from objects in the field of view 22. The system 12 may include any suitable number of infrared sensors 18. For example, the system 12 may include one infrared sensor 18 for each seat 14. As another example, the system 12 may include one infrared sensor 18 for each infrared-light source 16. As yet another example, the system 12 may include one infrared sensor 18 for the passenger cabin 32.

The system 12 includes infrared-indicator material 52. As one example, the infrared-indicator material 52 is the infrared-indicator threads 24. The infrared-indicator material 52 may interact with infrared light in any suitable manner. For example, the infrared-indicator material 52 may reflect infrared light. In this situation, the infrared-indicator material 52 may reflect infrared light toward the infrared sensor 18. In other words, the infrared sensor 18 may detect the reflected infrared light from the infrared-indicator material 52. In such an example, the infrared-indicator material 52 may be any suitable infrared reflective material, such as aluminum, gold, silver, infrared reflective ink, etc. As another example, the infrared-indicator material 52 may absorb infrared light. In this situation, the infrared sensor 18 may detect an absence of infrared light. In such an example, the infrared-indicator material 52 may be any suitable infrared absorbing material, such as acrylic glass, infrared absorbing ink, etc.

The infrared-indicator material 52 is disposed on the seat 14. Specifically, the infrared-indicator material 52 is disposed on the front 44 of the seat 14, e.g., facing the infrared sensor 18. The infrared-indicator material 52 is disposed on at least one of the seatback 36, the seat bottom 38, and the head restraint 40 in the pattern 28. In other words, the pattern 28 is on at least one of the seatback 36, the seat bottom 38, and the head restraint 40.

The infrared-indicator material 52 may be disposed on the seat 14 in any suitable manner. For example, the infrared-indicator material 52 may be threaded with the upholstery 20 in the pattern 28, as shown in FIGS. 4A and 4B. In such an example, the infrared-indicator material 52 may overlap the upholstery 20 of the seat 14. As another example, the infrared-indicator material 52 may be impressed on the seat 14 in the pattern 28, as shown in FIG. 4C.

The infrared-indicator material 52, e.g., the infrared-indicator threads 24, may include exposed portions 26 and unexposed portions (not shown). The exposed portions 26 may be disposed in front of the upholstery 20, and the unexposed portions may be disposed behind the upholstery 20. In other words, the exposed portions 26 may be disposed between the upholstery 20 and the infrared sensor 18, and the upholstery 20 may be disposed between the unexposed portions and the infrared sensor 18. In this situation, the exposed portions 26 may interact with the infrared light from the infrared-light source 16. Said differently, the infrared sensor 18 may detect the interaction between the infrared light and the exposed portions 26 of the infrared-indicator material 52. The exposed portions 26 are spaced from each other in the pattern 28.

Figure 2A:
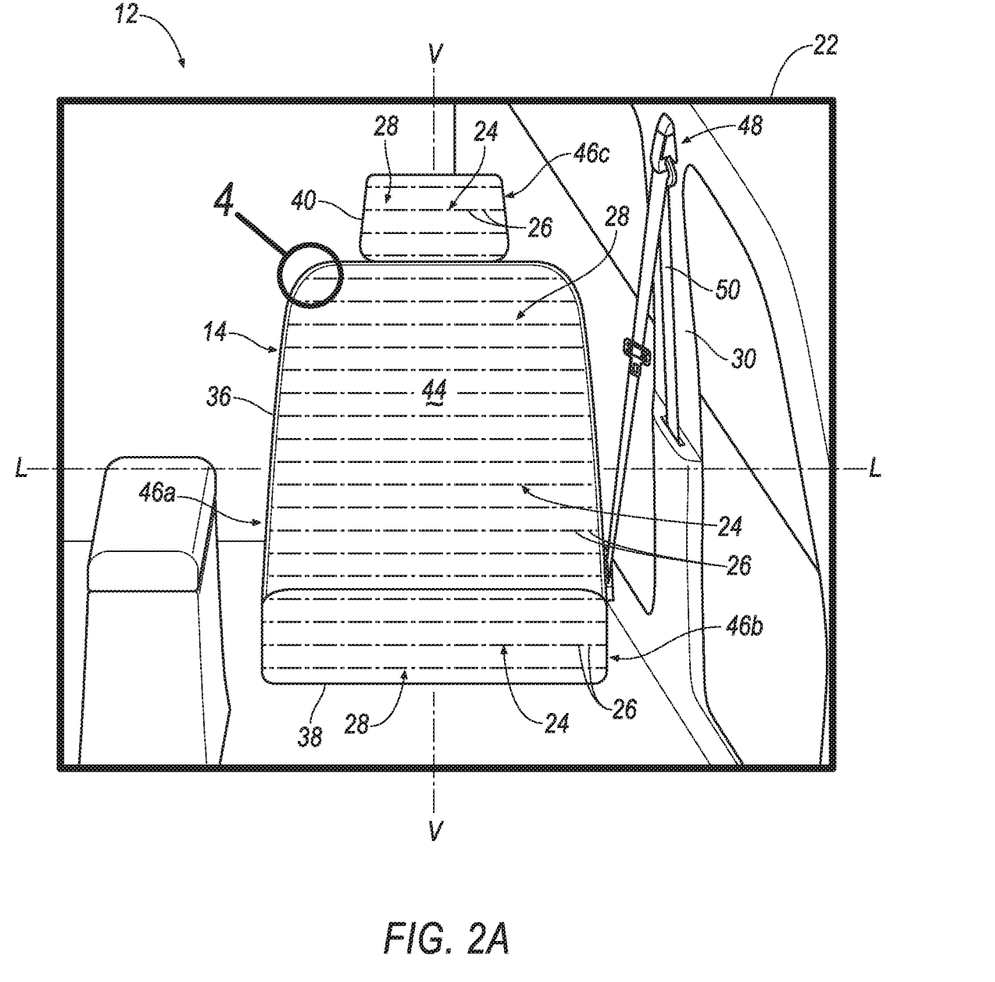
FIG. 2A is a field of view of an infrared sensor including the seat and infrared-indicator threads threaded to the seat in a pattern.
Figure 2B:
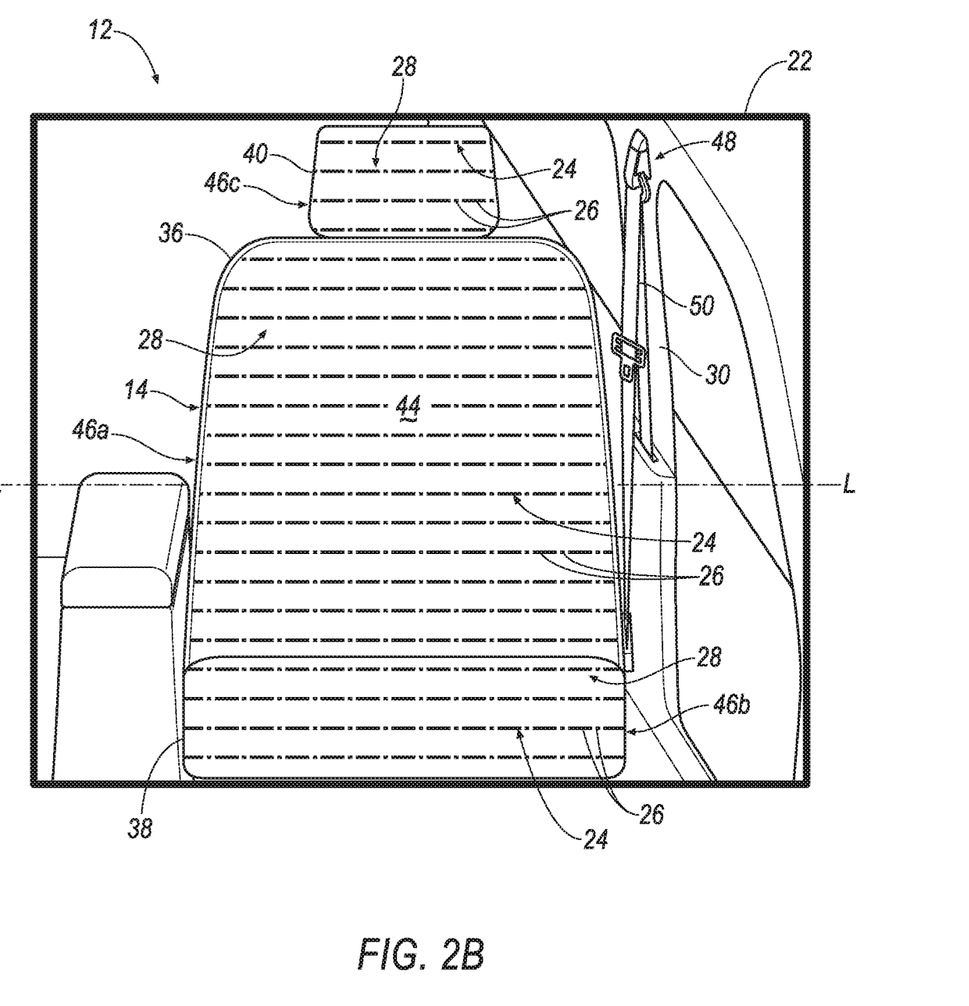
FIG. 2B is the field of view of the infrared sensor when the seat is closer to the infrared sensor as compared to FIG. 2A.
Figure 2C:
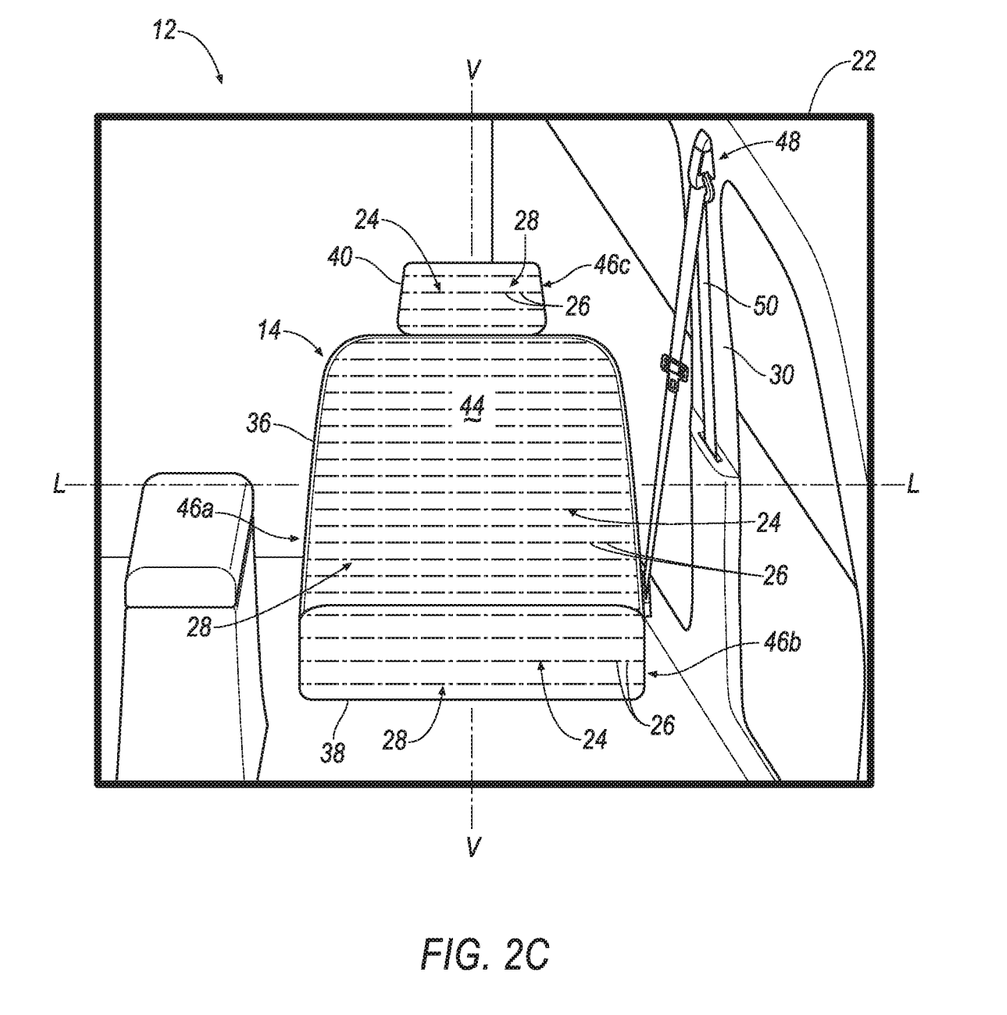
FIG. 2C is the field of view of the infrared sensor when a seatback of the seat reclined relative to the infrared sensor.
Figure 2D:
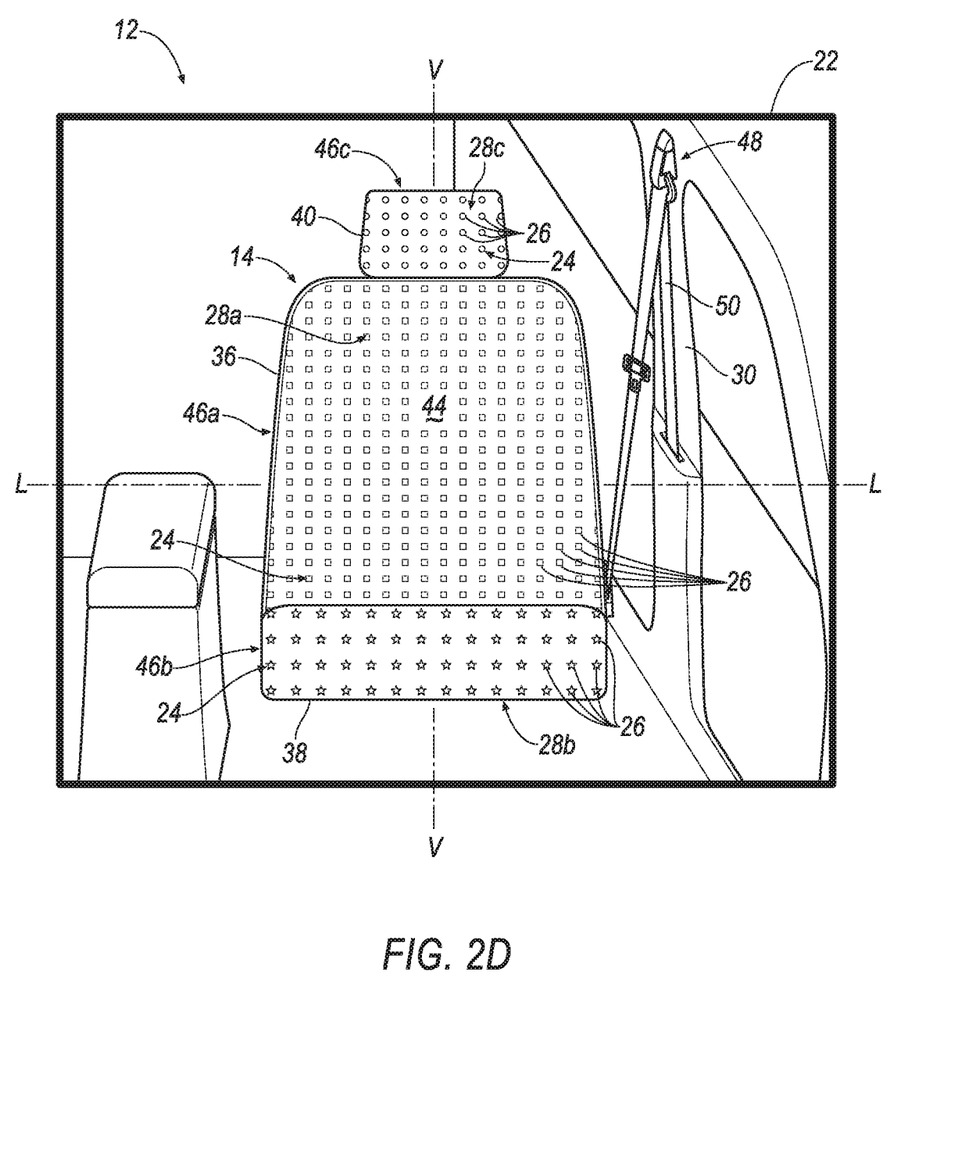
FIG. 2D is the field of view of the infrared sensor including the seat having a plurality of zones and each zone having a different pattern.

The exposed portions 26 of the infrared-indicator material 52 may have any suitable shape on the seat 14. For example, the exposed portions 26 of the infrared-indicator material 52 may be a line. As another example, the exposed portions 26 of the infrared-indicator material 52 may be a dot. As yet another example, the exposed portions 26 of the infrared-indicator material 52 may have a geometric shape, e.g., a circle, a polygon, or any other suitable shape, as shown in FIG. 2D. The exposed portions 26 may have one or more shapes, e.g., the pattern 28 may include alternating shapes of the exposed portions 26, as set forth below.

The pattern 28 may extend along at least one of the lateral axis L of the seat 14 and the vertical axis V of the seat 14. The pattern 28 may be any suitable type of pattern. For example, the pattern 28 may be a repeating pattern, as shown in the Figures. A repeating pattern is a cyclical repetition of an identifiable core. The core is the shortest string of elements that repeats. The core of the pattern 28 may be the exposed portions 26, e.g., the shape of the exposed portions 26. As one example, the pattern 28 may be a dot-dash pattern, i.e., the exposed portions 26 have alternating line and dot shapes, as shown in FIGS. 2A-2C. As another example, the pattern 28 may be a zigzag pattern, e.g., the exposed portions 26 form a line with alternating peaks and valleys. As yet another example, the pattern 28 may be a geometric pattern, e.g., the exposed portions 26 have geometric shapes, as shown in FIG. 2D. In such an example, some, or all, of the exposed portions 26 may have a same shape. Additionally, the pattern 28 includes gaps (not numbered) between the exposed portions 26. The gaps may be uniform, i.e., constant, between the exposed portions 26 in a repeating pattern. In other words, the space between each exposed portion 26 may be the same throughout the pattern 28.

As another example, the pattern 28 may be a growing pattern. A growing pattern is a pattern that increases or decreases with each sequence, e.g., by a constant difference, by a common ratio, etc. In the growing pattern, at least one of the exposed portions 26 and the gaps may increase or decrease with each sequence. For example, the exposed portions 26 may be a geometric shape that increases in size along at least one axis, i.e., the lateral axis L or the vertical axis V, of the seat 14. In other words, the perimeter of each exposed portion 26 may increase along at least one axis of the seat 14. In such an example, the shape of the exposed portions 26 may increase in size, e.g., along the vertical axis V from the seat bottom 38 to the head restraint 40. Additionally, or alternatively, the gaps may increase between each exposed portion 26 along at least one axis, i.e., the lateral axis L or the vertical axis V, of the seat 14. In such an example, the gap between each exposed portion 26 may increase in size, e.g., along the vertical axis V from the seat bottom 38 to the head restraint 40.

Figure 3:
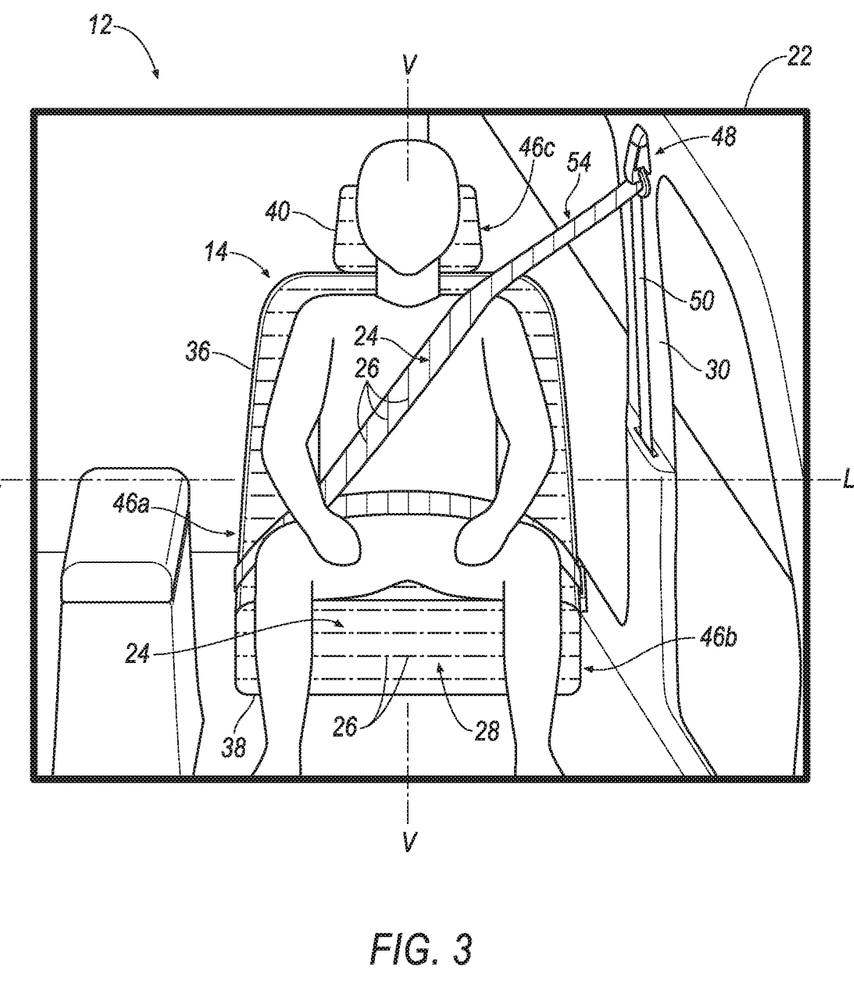
FIG. 3 is the field of view of the infrared sensor including a seatbelt and infrared-indicator threads threaded to the seatbelt in a second pattern.

The pattern 28 may be the same on the front 44 of the seat 14, e.g., the seat bottom 38, the seatback 36, and the head restraint 40. In other words, the system 12 may include one pattern on the seat 14. Alternatively, the system 12 may include a plurality of patterns. For example, the infrared-indicator material 52 may be threaded with the webbing 50 in a second pattern 54, as shown in FIG. 3. The second pattern 54 may be any suitable type of pattern 28, i.e., repeating, growing, etc. The second pattern 54 may be different than the pattern 28. For example, the exposed portions 26 of the second pattern 54 may have a different shape or orientation of the exposed portions 26 of the pattern 28, as shown in FIG. 3. The infrared-indicator material 52 may be threaded with the webbing 50 in any suitable manner, as set forth further below. As another example, each zone 46a, 46b, 46c of the seat 14 may include one pattern 28a, 28b, 28c. In other words, the pattern 28 may be different in each zone 46 of the seat 14. For example, the shape may be different for the exposed portions 26 of the respective zones 46a, 46b, 46c, as shown in FIG. 2D. As another example, each zone 46 may be a different type of pattern, e.g., repeating, growing, etc.

The infrared-indicator material 52 may be any suitable type of material. One embodiment of the infrared-indicator material 52 is shown in FIG. 4A, another embodiment of the infrared-indicator material 52 is shown in FIG. 4B, and another embodiment of the infrared-indicator material 52 is shown in FIG. 4C. In the embodiment shown in FIG. 4A, the infrared-indicator material 52 is infrared-indicator threads 24 threaded with the upholstery 20. In the embodiment shown in FIG. 4B, the infrared-indicator material 52 is a sheet 56 woven with the threads 42 of the upholstery 20. In the embodiment shown in FIG. 4C, the infrared-indicator material 52 is ink 58 impressed onto the upholstery 20.

In the embodiment shown in FIG. 4A, the infrared-indicator material 52 may be threads. In other words, the infrared-indicator material 52 may be referred to as the infrared-indicator threads 24. The infrared-indicator threads 24 may be threaded to the upholstery 20 in any suitable manner. For example, the infrared-indicator threads 24 may be woven to the upholstery 20, as shown in FIG. 4A. In other words, the infrared-indicator threads 24 may be monolithic with the upholstery 20, i.e., made with the upholstery 20. In such an example, the upholstery 20 is cloth and woven with the infrared-indicator threads 24. For example, the infrared-indicator threads 24 may extend along at least one of the lateral axis L and the vertical axis V. In other words, the infrared-indicator threads 24 may be at least some of the horizontal threads 42b, i.e., weft threads, and/or the vertical threads 42a, i.e., warp threads, of the upholstery 20. In this embodiment, the infrared-indicator threads 24 are woven with the upholstery such that the exposed portions 26 overlap the threads 42 of the upholstery in the pattern 28.

As another example, the infrared-indicator threads 24 may be stitched to the upholstery 20. In other words, the infrared-indicator threads 24 may be a separate component of the upholstery 20 and subsequently assembled to the upholstery 20. Said differently, the infrared-indicator threads 24 may be looped over threads 42 of the upholstery 20, i.e., the exposed portions 26 overlap the upholstery 20. The infrared-indicator threads 24 may be stitched to the upholstery 20 such that the infrared-indicator threads 24 extend along at least one of the lateral axis L and the vertical axis V. The infrared-indicator threads 24 may be stitched to any type of upholstery 20, i.e., cloth, leather, etc. In this embodiment, the infrared-indicator threads 24 are stitched to the upholstery such that the exposed portions 26 overlap the threads 42 of the upholstery in the pattern 28.

As another example, the infrared-indicator threads 24 may be threaded with the threads of the webbing 50 in the second pattern 54 in any suitable manner. The infrared-indicator threads 24 may be threaded with the threads of the webbing 50 in a same or different manner as the infrared-indicator threads 24 are threaded with the upholstery 20. For example, the infrared-indicator threads 24 may be stitched to the webbing 50. As another example, the infrared-indicator threads 24 may be woven with the threads of the webbing 50. In this situation, the infrared-indicator threads 24 may be at least some of the first plurality of threads and/or the second plurality of threads. In other words, the infrared-indicator threads 24 are woven with the threads of the webbing 50 such that the exposed portions 26 of the infrared-indicator threads 24 overlap the threads of the webbing 50 in the second pattern 54.

In the embodiment shown in FIG. 4B, the infrared-indicator material 52 may be the sheet 56. The sheet 56 may be disposed on the front 44 of the seat 14. The sheet 56 may extend any suitable amount along the lateral axis L and the vertical axis V of the seat 14. For example, the sheet 56 may extend across the entire front 44 of the seat 14, i.e., the seatback 36, the seat bottom 38, and the head restraint 40. As another example, the sheet 56 may extend across a portion of the front 44 of the seat 14, e.g., the front 44 of the seatback 36. The sheet 56 may, for example, be flat, as shown in FIG. 4B, i.e., the sheet 56 may be thin in a direction transverse to the lateral axis L and the vertical axis V. As another example, the sheet 56 may be curved along at least one of the lateral axis L and the vertical axis V. Said differently, the sheet 56 may be curved to match the contour of the seat 14.

With continued reference to FIG. 4B, the sheet 56 may include a plurality of perforations 60 spaced from each other throughout the sheet 56. In other words, the plurality of perforations 60 may be spaced from each other along the lateral axis L and the vertical axis V of the seat 14. The sheet 56 may be interwoven with the upholstery 20. In other words, at least one of the horizontal threads 42b and the vertical threads 42a of the upholstery 20 may be woven through the perforations 60 in the sheet 56. For example, the horizontal threads 42b may be woven through the perforations 60 in the sheet 56, and the vertical threads 42a may extend between the perforations 60. In this embodiment, the exposed portions 26 of the sheet 56 are disposed between the threads 42 of the upholstery 20. In other words, the perforations 60 may be spaced from each other such that, when the threads 42 are woven through the perforations 60, the exposed portions 26 of the sheet 56 are in the pattern 28.

In the embodiment shown in FIG. 4C, the infrared-indicator material 52 may be impressed onto the upholstery 20. In this embodiment, the infrared-indicator material 52 lacks the unexposed portions. In other words, the exposed portions 26 of the infrared-indicator material 52 are impressed onto the upholstery 20. In this embodiment, the upholstery 20 is leather. The infrared-indicator material 52 may, for example, be ink 58. The ink 58 may be printed onto the upholstery 20 by any known process. In such an example, the ink 58 may be printed on the upholstery 20 in the pattern 28, as shown in FIG. 4C. As another example, the infrared-indicator material 52 may be threads, i.e., infrared-indicator threads 24, deposited on the upholstery 20. In this situation, the seat 14 may include a clearcoat (not shown), i.e., a paint without pigment. The clearcoat may be applied over the infrared-indicator threads 24 and the upholstery 20. In this situation, the clearcoat may fixed the infrared-indicator threads 24 to the upholstery 20 in the pattern 28.

The system 12 may include a computer (not shown). The computer may be a microprocessor-based computing device implemented via circuits, chips, or other electronic components. The computer includes a processor, memory, etc. The memory of the computer includes memory for storing instructions executable by the processor as well as for electronically storing data and/or databases. The computer may be programmed to optimize one or more vehicle safety features based on at least one of the size of the occupant, the position of the seat 14, and the angular position of the seatback 36.

The computer may include a plurality of modules, i.e., physical components having a processor, memory, etc., in communication with each other. For example, the computer may include a vision module, which may be in communication with and may control the infrared sensor 18, and a restraint control module, which may be in communication with and may control one or more vehicle safety features. In such an example, the vision module may determine at least one of the size of the occupant, the position of the seat 14, and the angular position of the seatback 36. The vision module may, for example, send information of at least one of the size of the occupant, the position of the seat 14, and the angular position of the seatback 36 to the restraint module. The restraint module may, for example, optimize one or more vehicle safety features based on the information from the vision module.

The computer may transmit and receive data through a communications network such as a controller area network (CAN) bus, Ethernet, WiFi, Local Interconnect Network (LIN), onboard diagnostics connector (OBD-II), and/or by any other wired or wireless communications network. The computer may be in communication with the infrared sensor 18, the infrared-light source 16, and other components via the communications network.

The memory may store instructions executable by the processor to detect and identify the position of the seat 14. In other words, the computer may identify the position of the seat 14 relative to the infrared sensor 18. The computer, e.g., the vision module, may make such identifications based on information received from the infrared sensor 18 via the communication network. Specifically, the computer may make such identifications based on the pattern 28. In other words, the pattern 28 may transmit information to the computer indicating a distance from the seat 14 to the infrared sensor 18. For example, the exposed portions 26 of the infrared-indicator material 52 may appear larger when the seat 14 is relatively closer to the infrared sensor 18, as shown in FIG. 2B. Alternatively, the exposed portions 26 of the infrared-indicator material 52 may appear smaller when the seat 14 is relatively farther from the infrared sensor 18. As another example, when the seat 14 is closer to the infrared sensor 18, the seat 14 takes up a greater portion of the field of view 22 of the sensors, as shown in FIG. 2B, which makes the exposed portions 26 of the infrared-indicator material 52 take up a greater portion of the field of view 22 of the infrared sensor 18 as compared to when the seat 14 is farther from the infrared sensor 18.

The memory may store instructions executable by the processor to selectively actuate or refrain from actuating one or more safety features of the vehicle 10 based on the position of the seat 14. The computer may compare the position of the seat 14 with a threshold. When the detected position of the seat 14 is within the threshold, the computer, e.g., the restraint module, may selectively actuate or refrain from actuating one or more safety features of the vehicle 10. When the detected position of the seat 14 is further than the threshold, the computer may actuate the one or more safety features of the vehicle 10. In other words, the computer may optimize the actuation of one or more safety features of the vehicle 10 based on the position of the seat 14.

The memory may store instructions executable by the processor to detect and identify the angular position of the seatback 36. In other words, the computer may identify the angular position of the seatback 36 relative to the infrared sensor 18. The computer, e.g., the vision module, may make such identifications based on information received from the infrared sensor 18 via the communication network. Specifically, the computer may make such identifications based on the pattern 28. In other words, the pattern 28 may transmit information to the computer indicating an angle of the seatback 36 relative to the infrared sensor 18. For example, the exposed portions 26 of the infrared-indicator material 52 may appear closer together along the vertical axis V of the seat 14, as shown in FIG. 2C, when the seatback 36 is pivoted away from the infrared sensor 18, i.e., reclining, as compared to when the seatback 36 is, e.g., upright relative to the infrared sensor.

The memory may store instructions executable by the processor to selectively actuate or refrain from actuating one or more safety features of the vehicle 10 based on the angular position of the seatback 36. The computer may compare the angular position of the seatback 36 with a threshold. When the detected angular position of the seatback 36 is further than the threshold, the computer, e.g., the restraint module, may selectively actuate or refrain from actuating one or more safety features of the vehicle 10. When the detected angular position of the seatback 36 is within than the threshold, the computer may actuate the one or more safety features of the vehicle 10. In other words, the computer may optimize the actuation of vehicle safety features based on the angular position of the seatback 36.

The memory may store instructions executable by the processor to detect and identify the occupant on the seat 14. The computer may identify whether the occupant is on the seat 14. The computer may identify a size of the occupant, e.g., height, size, weight, etc. The computer, e.g., the vision module, may make such identifications based on the information received from the infrared sensor 18 via the communication network. Specifically, the computer may make such identifications based on the pattern 28 detected by the infrared sensor 18. For example, the infrared sensor 18 may detect the pattern 28 on the seat 14 around the occupant, as shown in FIG. 3. In other words, the pattern 28 may provide an outline of the occupant on the seat 14. Said differently, the occupant may interfere with the pattern 28 on the seatback 36 such that the computer may determine the size of occupant relative to the seat 14 based on the pattern 28. Additionally, the computer may make such identifications based on the second pattern 54 detected by the infrared sensor 18. The computer may, for example, determine the size of the occupant between the seatback 36 and the seatbelt based on the second pattern 54. For example, the exposed portions 26 of the second pattern 54 may be distorted based on the webbing 50 engaging the occupant. As another example, the computer may detect the amount of webbing 50 paid out from the retractor based on the second pattern 54, e.g., the number of exposed portions 26 detected.

The memory may store instructions executable by the processor to selectively actuate or refrain from actuating one or more safety features of the vehicle 10 based on the size of the occupant. The computer may compare the detected size of the occupant, e.g., height, weight, etc., with a respective threshold. When the detected size of the occupant is below the respective threshold, the computer, e.g., the restraint module, may selectively actuate or refrain from actuating one or more safety features of the vehicle 10. When the detected size of the occupant is above the respective threshold, the computer may actuate the one or more safety features of the vehicle 10. In other words, the computer may optimize the actuation of vehicle safety features based on the size of the occupant.

In general, the computing systems and/or devices described may employ any of a number of computer operating systems, including, but by no means limited to, versions and/or varieties of the Ford Sync® application, App-Link/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In operation, an occupant enters the vehicle 10 and sits on the seat 14. The occupant may adjust the position of the seat 14 relative to the floor 34, e.g., by sliding the seat 14 along the seat track. Additionally, the occupant may adjust the angular position of the seatback 36 relative to the seat bottom 38. The infrared-light source 16 directs infrared light toward the seat 14, and the infrared-indicator material 52 interacts with the infrared light, e.g., reflects the infrared light. The infrared sensor 18 detects the interaction between the infrared light and the infrared-indicator material 52. The infrared sensor 18 transmits a signal to the computer that indicates the size of the occupant, the position of the seat 14, and the angular position of the seatback 36 based on the pattern 28 detected on the upholstery 20. If the size of the occupant is below a threshold and/or the position of the seat 14 is within a threshold and/or the angular position of the seatback 36 is within a threshold, the computer may adjust one or more vehicle safety features. For example, the computer may send a signal to one or more vehicle safety features to refrain from actuating during a vehicle impact. As another example, the computer may send a signal to one or more vehicle safety features specifying a component setting so that, in the event of a vehicle impact, safety features of the vehicle 10 are optimized to at least one of the size of the occupant, the position of the seat 14, and the angular position of the seatback 36.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system comprising:
a seat including an upholstery;
an infrared-light source spaced from the seat and aimed at the seat;
an infrared sensor having a field of view, the seat disposed in the field of view; and
infrared-indicator threads threaded with the upholstery and including exposed portions overlapping the upholstery in a pattern;
wherein the seat includes a plurality of zones extending along a lateral axis of the seat and a vertical axis of the seat transverse to the lateral axis, the pattern being different in each zone of the seat.

2. The system of claim 1, wherein the infrared-indicator threads are stitched to the upholstery.

3. The system of claim 1, wherein the infrared-indicator threads are woven into the upholstery.

4. The system of claim 1, wherein the infrared-indicator threads reflect infrared light.

5. The system of claim 1, wherein the infrared-indicator threads absorb infrared light.

6. The system of claim 1, further comprising a seatbelt and infrared-indicator threads threaded with the seatbelt in a second pattern different from the pattern.

7. The system of claim 1, the pattern is a repeating pattern.

8. The system of claim 1, the pattern is a growing pattern.

9. The system of claim 1, wherein the seat includes a seatback, and further comprising a processor and a memory storing instructions to identify an angular position of the seatback in response to detecting the pattern.

10. The system of claim 1, wherein the seat includes a seatback, a seat bottom, and a head restraint, the seatback, the seat bottom, and the head restraint each being one zone.

11. The system of claim 1, wherein the seat includes a seatback, a seat bottom, and a head restraint, at least one of the seatback, the seat bottom, and the head restraint having the plurality of zones.

12. The system of claim 1, further comprising a processor and a memory storing instructions to identify a size of an occupant in response to detecting a gap in the pattern.

13. The system of claim 1, further comprising a processor and a memory storing instructions to identify a position of the seat in response to detecting the pattern.

14. A system comprising:
a seat including an upholstery having threads;
an infrared-light source spaced from the seat and aimed at the seat;
an infrared sensor having a field of view, the seat disposed in the field of view; and
an infrared-indicator material woven with the threads and including exposed portions overlapping the threads in a pattern;
wherein the seat includes a plurality of zones extending along a lateral axis of the seat and a vertical axis of the seat transverse to the lateral axis, the pattern being different in each zone of the seat.

15. The system of claim 14, wherein the infrared-indicator material is threads.

16. The system of claim 14, wherein the infrared-indicator material is a sheet including a plurality of perforations, the threads of the upholstery woven through the plurality of perforations.

17. A system comprising:
a seat including an upholstery, the upholstery being leather;
an infrared-light source spaced from the seat and aimed at the seat;
an infrared sensor having a field of view, the seat disposed in the field of view; and
an infrared-indicator material including exposed portions impressed onto the upholstery in a pattern;
wherein the seat includes a plurality of zones extending along a lateral axis of the seat and a vertical axis of the seat transverse to the lateral axis, the pattern being different in each zone of the seat.

18. The system of claim 17, wherein the infrared-indicator material is threads deposited on the upholstery.

19. The system of claim 17, wherein the infrared-indicator material is ink printed on the upholstery.

* * * * *